(No Model.) 4 Sheets—Sheet 1.

H. M. KEITH.
Combined Agricultural Implement.

No. 238,788. Patented March 15, 1881.

(No Model.) 4 Sheets—Sheet 2.

H. M. KEITH.
Combined Agricultural Implement.

No. 238,788. Patented March 15, 1881.

Attest:
H. D. Perrine.
Floyd Norris.

Inventor:
Horace Mason Keith
By Johnson & Johnson
Atty's

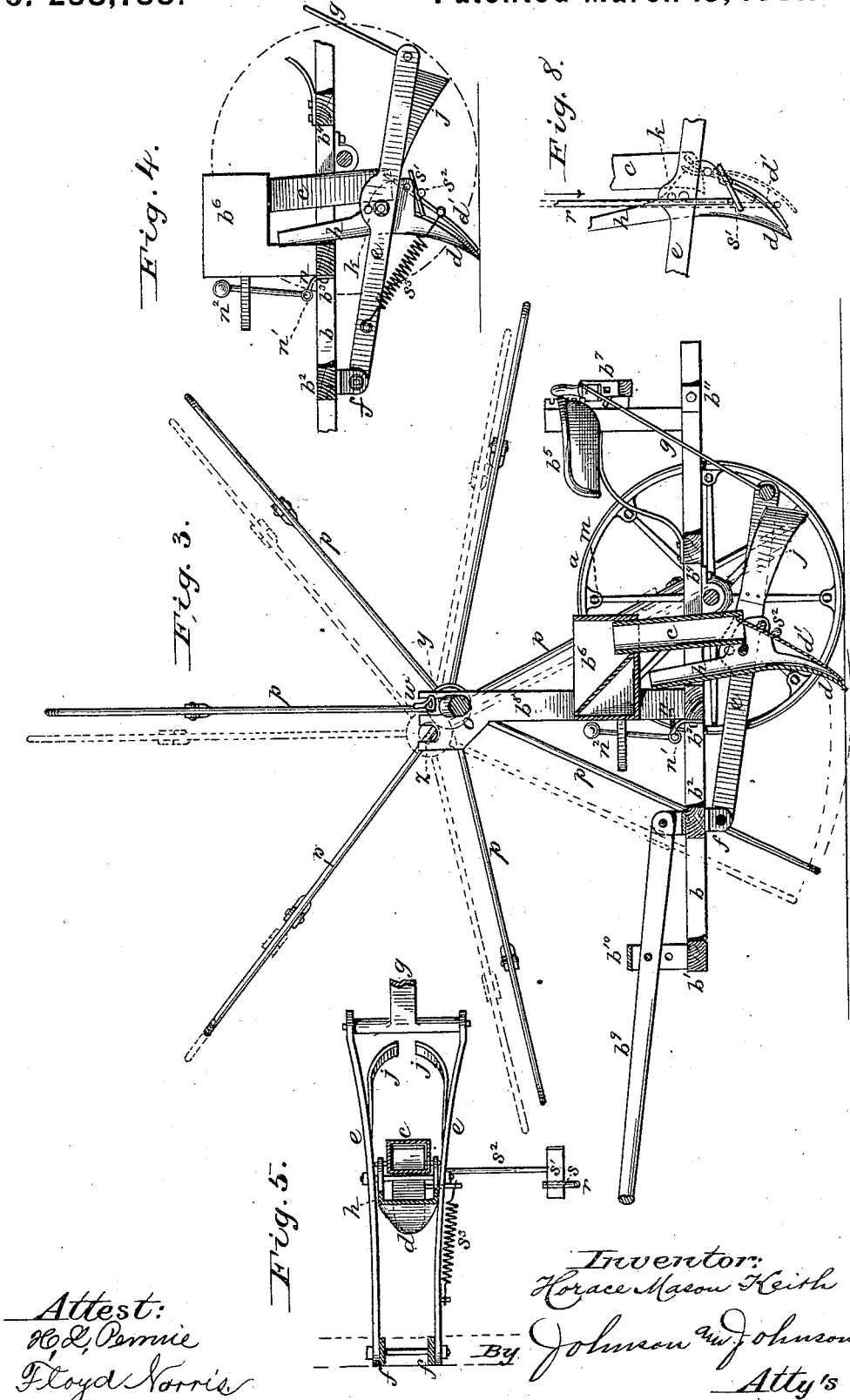

(No Model.) 4 Sheets—Sheet 4.
H. M. KEITH.
Combined Agricultural Implement.
No. 238,788. Patented March 15, 1881.
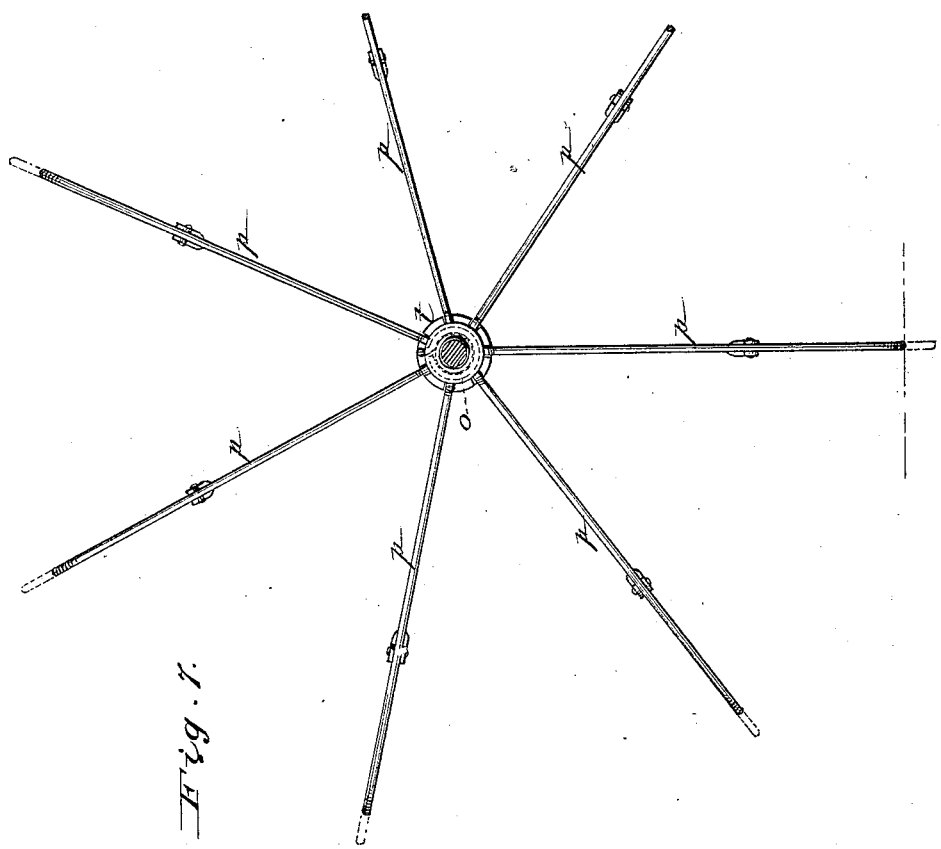
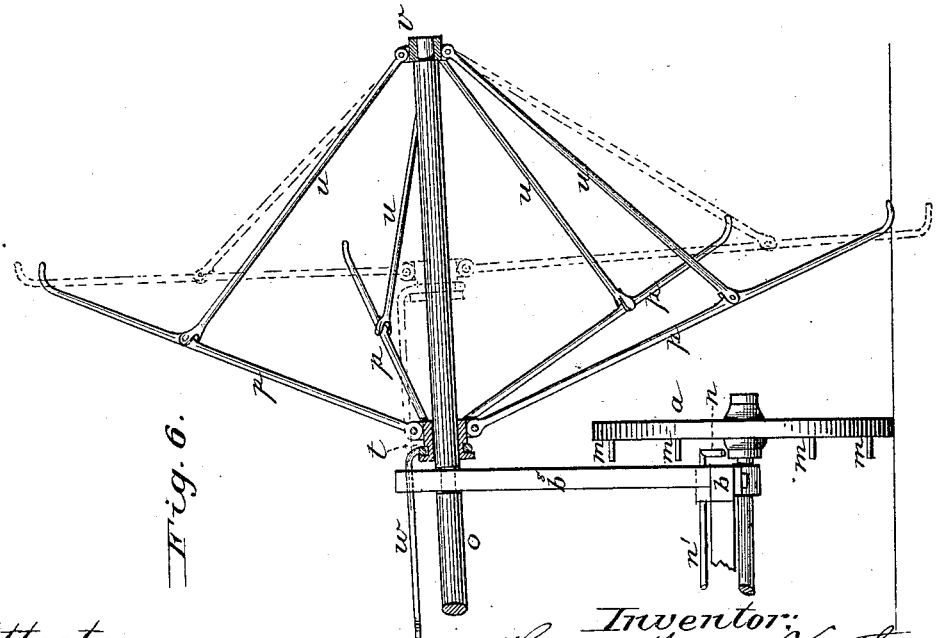
Attest:
H. L. Pomue
Floyd Norris
Inventor:
Horace Mason Keith
By Johnson and Johnson
Atty's

UNITED STATES PATENT OFFICE.

HORACE M. KEITH, OF COMMERCE, ASSIGNOR OF ONE-HALF TO JOEL PEASE HARGER, OF WEST BROOMFIELD, MICHIGAN.

COMBINED AGRICULTURAL IMPLEMENT.

SPECIFICATION forming part of Letters Patent No. 238,788, dated March 15, 1881.

Application filed November 2, 1880. (No model.)

*To all whom it may concern:*

Be it known that I, HORACE MASON KEITH, a citizen of the United States, residing at Commerce, in the county of Oakland and State of Michigan, have invented new and useful Improvements in Combined Agricultural Implements, of which the following is a specification.

I have produced an improved combined agricultural implement in which a potato-planter and potato-digger are adapted for separate use upon the same frame with a laterally-shifting tongue, thereby saving the cost of separate machines for these separate operations. The combined implement is made and sold as an entirety, and is used in its separate operations or purposes by detaching either the planting and hill-checking parts or the digging parts.

The invention consists in the construction and adaptation of a permanent frame for supporting and carrying the separate attachments for the separate operations, in features of construction and combination in the planting parts, and in the construction of the hill-checker.

The attachments constituting the potato-digger form the subject of a separate patent, and will not be specifically claimed herein, and only described with respect to their relation to the frame and the laterally-shifting tongue.

Figure 1:
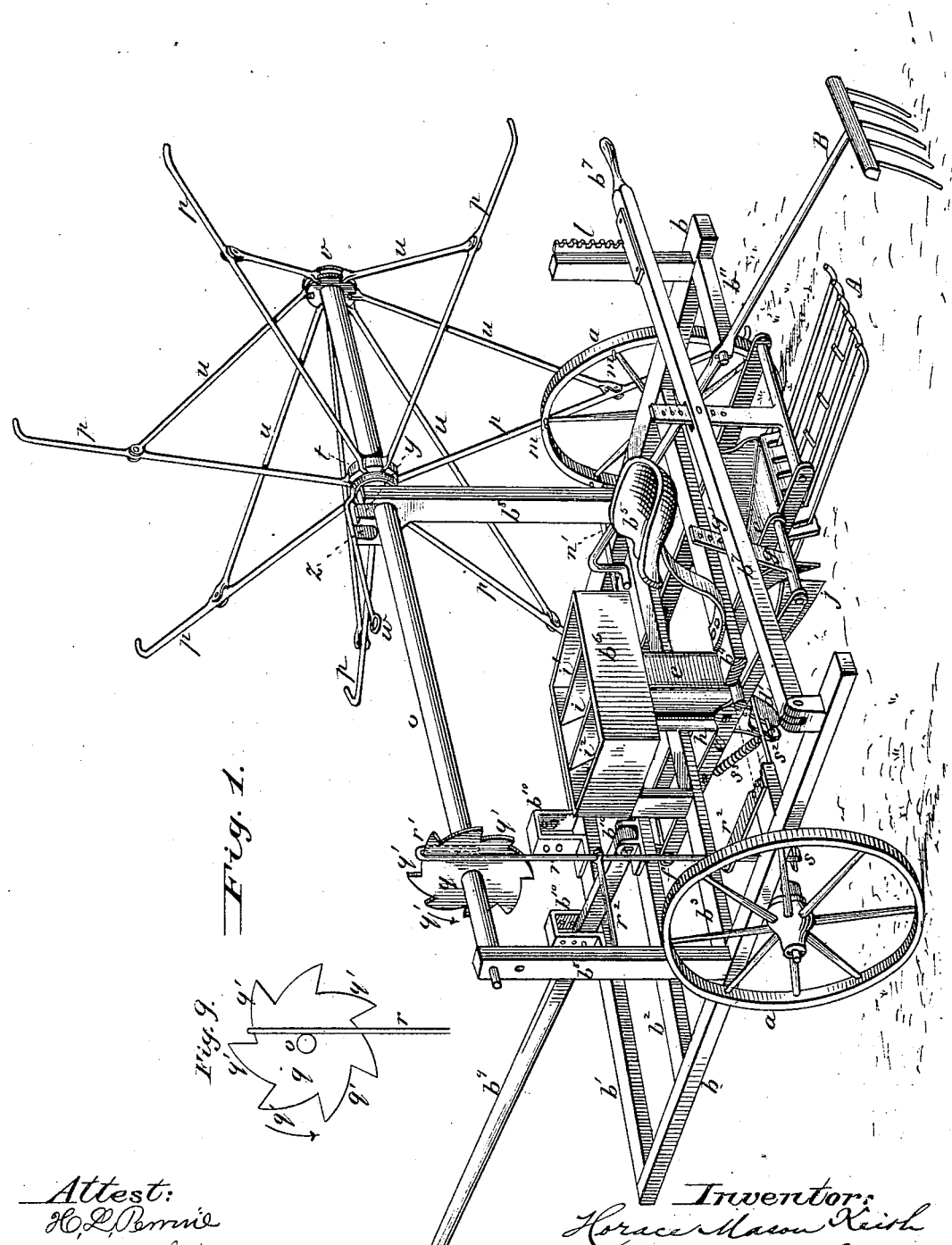
Figure 2:
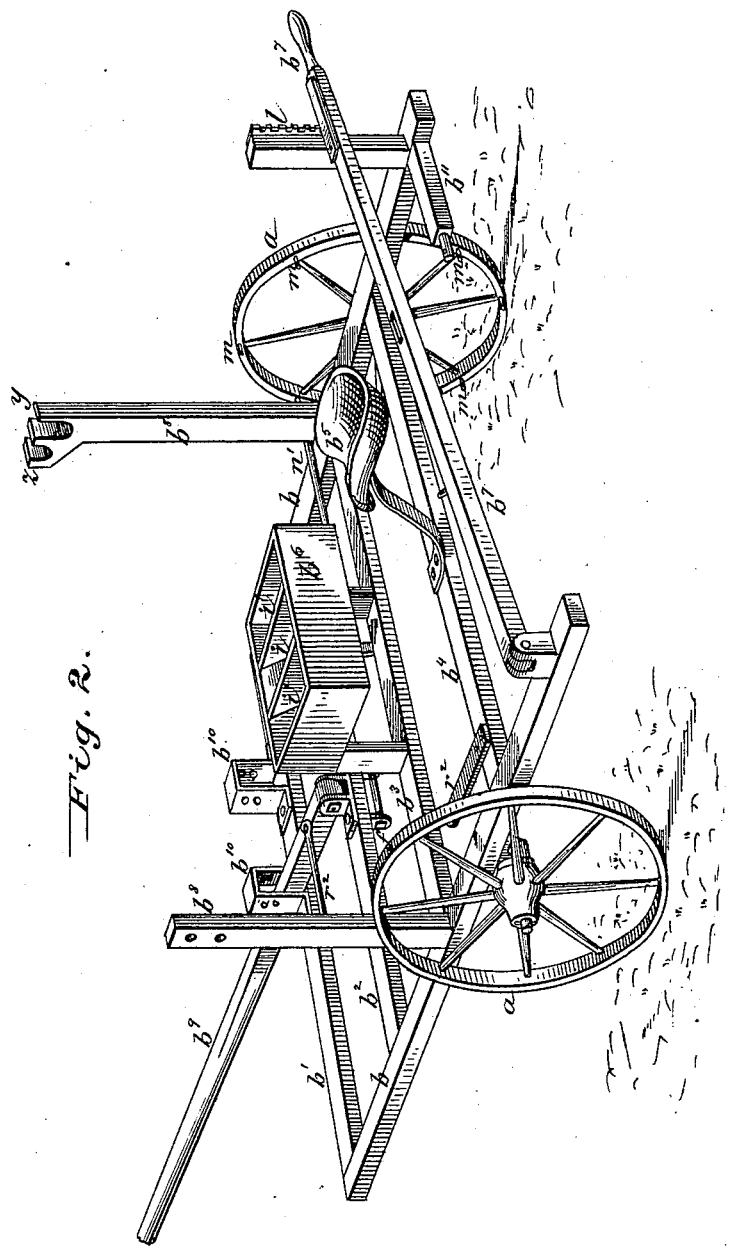

In the accompanying drawings, Figure 1 represents, in perspective, the machine or implement complete in all its attachments for the separate purposes stated; Fig. 2, the permanent frame, showing the supports and adaptation for the attachment of the planting, hill-checking, and digging parts; Fig. 3, a vertical section through the planting parts, the dotted lines showing the hill-checker supported out of operation; Fig. 4, a side view of the planting parts; Fig. 5, a top view of the hinged arms, which carry the planting-tube and the coverers. Figs. 6 and 7 show the hill-checker in its different adjustments for planting check-rows of different distances apart, and Fig. 8 a detail of the valve-opening device.

In these several views the same letters indicate the same parts.

In the drawings the digging and gathering parts are shown in Fig. 1 in their relation to the frame; but it will be understood that these parts are detached when the machine is used for planting.

The frame of the combined machine is supported by and upon the wheels $a\ a$, which may turn loosely upon short axles, or with a single connecting-axle, as may be deemed best. It consists of two side bars, $b\ b$, united at the front by parallel cross-bars $b'\ b^2$ and at the middle by cross-bars $b^3\ b^4$, the latter of which carries the seat $b^5$ for the seed-dropper, while upon the bar $b^3$ the hopper $b^6$ for the potato-seed is supported in front of the axle and at a point centrally between the wheels, so that the seat for the person who drops the seed will be in rear of the axle and with his weight nearly balance the machine. The side bars extend back of the seat $b^5$ and support a cross-lever, $b^7$, from which the rear end of the planting (or the digging) attachment is suspended, while to the inner front cross-bar, $b^2$, these attachments are pivoted for separate use. From the side bars of the frame, at a point in line or thereabout with the middle bar, which supports the hopper, rise the standards $b^8\ b^8$, which support, above the hopper, the revolving hill-checker and its operating connections with the dropping-tube valve.

The digging and uncovering attachment A is suspended from and beneath the frame near one of the side-bars, while the front cross-bars, $b'\ b^2$, are provided with means for securing the tongue $b^9$ either in the line of the planting attachment or of the digging attachment, thereby providing a laterally-adjustable tongue for a permanent frame adapted to receive for separate use a planter or a digger for potatoes with different lines of draft.

In Fig. 2 $b^{10}\ b^{10}$ represent loops in the front cross-bars as a means of securing the tongue in its different positions of draft. An arm, $b^{11}$, extends inward from the side bar next the digger as a means of supporting a rake, B, for operating with the digger for gathering the uncovered potatoes into piles, and it is operated by the occupant of the seat. This completes the fixtures of the frame to adapt it for the attachments, which I have stated are separately used.

The wheels $a\ a$ are seven and a half feet apart, and the furrow-forming tooth, being midway between them and one of the wheels running in the last planted row, will serve as a mark by which the rows are run at equal distances apart, the wheels occupying the width of two rows, thus rendering it unnecessary to mark the potato-ground in that direction.

The seed-hopper being a fixture of the frame, forms a guide for the centrally-arranged dropping-tube $c$ for the seed, and which is made vertically adjustable with the furrow-forming tooth $d$ and the coverers. These adjustable parts are pivoted to and supported by and between two arms, $e$ $e$, which are pivoted at their front ends to hangers $f$ of the cross-bar $b^2$, and are united at their rear ends by a brace, $g$, pivoted thereto, and which, rising, is adjustably secured to the cross-lever $b^7$. The dropping-tube is adjustably attached to side extensions of the tooth $d$, and the latter forms a continuation of said tube. A bracing-shank, $h$, rises from the tooth, and is supported by the middle cross-bar, thus supporting the tooth against the resistance of the earth in planting, and at the same time allowing of its free vertical adjustment with the planting-tube, which, for this purpose, has no attachment to the hopper, but enters a middle-inclosed guide, $i$, Figs. 1 and 2, therein, leaving the side divisions $i'$ and $i^2$ to hold the seed.

The coverers $j$, for covering in the planted hills, are attached to the inner sides of the pivoted arms $e$ $e$, in rear of the dropping-tube, and the connection of the tooth with said arms is made adjustable by the holes $k$, so that raising or lowering the tooth on the arms causes the tooth to run more or less in the ground, as may be desired in relation to the coverers, while, by raising or lowering the pivoted brace $g$, which has holes $g'$ for this purpose, the tooth and the coverers can be set to run the desired depth. This adjustment is made upon the cross-lever $b^7$, which, being pivoted upon one of the side-bars $a$, crosses the frame and is secured beneath a shouldered post or catch, $l$, on the other side bar, thus holding the planting device firmly to work. In turning the machine at the end of the row, or in going to and from the field, this cross-lever is raised and supported upon the catch-post, thus holding the planting and covering parts free from the ground. As the potato-digger is supported by this cross-lever in a similar manner, it is, when used, held in and supported above the ground in the same manner and for the same purpose.

The dropping-tube is of a length sufficient to maintain its projection into the hopper-guide $i$ when the tooth is at its lowest adjustment. In the adaptation of the implement as a planter the tongue is secured in the middle of the frame and in line with the planting attachment, as shown in the drawings, and it is shifted laterally to the loops $b^{10}$ $b^{10}$ when the digger is used.

The furrow-forming tooth is provided with a pivoted or hinged valve, $d'$, which is operated to drop the seed in hills by means of a hill-checker, to be presently described.

In the operation of the implement it is important that the person who drops the seed should have some means by which to indicate the time when he should do so. For this purpose I employ an alarm or signal, operated by one of the driving-wheels, which is provided on its inner side with pins $m$, placed the same distance apart as the hills in which the potatoes are to be planted, and as the wheel revolves these pins strike and depress the bent end $n$ of a rod, $n'$, secured in bearings upon the frame, and having a projecting knobbed arm, $n^2$, rising in front of the hopper, which is caused to be thrown against and to strike it or a bell each time a pin depresses and passes the crank end $n$, which must be after a seed has been planted. The signal only indicates when the tube is empty, the pins only acting after each checking-arm has passed the mark of the planted hill. Having both hands, by which to drop the potatoes, and two divisions of the hopper, from which to take them, it will be an easy matter to drop a seed-potato as often as the indicator strikes. The knob falls back by its weight, after giving the alarm, to bring its cranked end up in position to be struck by the next pin of the wheel. The feed-boy sits in the seat $b^5$, with his legs astride the dropping-tube $c$ and beneath the hopper, which is raised above the middle bar for that purpose.

I have stated the valve of the seed-dropping tube is operated by a revolving hill-checker, the construction of which and the manner of effecting this operation I will now describe.

It will be understood that the land requires no marking in the direction the machine is planting, as the distance between the rows is governed by the wheel running in the last-planted row, and that it is only necessary to mark the land for the check-rows the required distance apart—say, three feet. The hill-checker consists of a shaft, $o$, mounted upon the side standards, and, projecting beyond the frame at one side, carries radial arms $p$, of a length to cause them to travel in the ground by the side of the machine, as a means of revolving said shaft, and, being the same distance apart at their ends as the check-rows, each arm is caused thereby to travel in said rows as marks, to determine the dropping of the seed. Near the opposite end of said shaft there is secured a plate, $q$, similar to a circular saw, the teeth $q'$ of which are of equal number with the arms $p$, and the plate is set so that the radial edges of the teeth will be coincident with the marking-arms. A vertical rod, $r$, is hung by a bent end, $r'$, upon this saw-toothed wheel, being held in position thereon by suitable guides $r^2$ on the frame, said rod having an angular lower termination, $s$, which stands in such relation to an arm, $s'$, on the valve-rod $s^2$ as to cause, by the descent of the suspended end $r'$ of said rod from the point of one tooth to the heel of the succeeding tooth, the valve $d'$ to be opened at the moment the marking-arms stand vertical over said mark as they revolve, and thus drop the seed in check-rows. The valve $d'$ is pivoted or hinged in the bottom of the tube, and is kept closed by a spring, $s^3$, attached to said valve and the hinged arm $e$, while the arm $s'$ stands in its normal position at an angle of about forty-five degrees and at right angles to its carrying-rod, so that as the vertical rod falls upon said inclined arm its weight depresses said arm, and, turning the valve-rod, opens the valve. In this fall of the rod upon the arm it passes beneath and free of said arm $s'$, and allows the valve to be instantly closed to hold the next seed dropped into the tube. The vertical rod is then caused to be slowly lifted by the sawtooth as the wheel revolves, raising the bent end $s$ back of the arm $s'$, to be in readiness to again fall and open the valve, as before, as soon as the next marking-arm reaches a vertical position over the mark.

The marking-arms are from four to seven feet long, and they are pivoted to a collar, $t$, which is adapted to be adjusted upon the shaft in the direction of its length; and they are supported in their radial positions by braces $u$, pivoted to a fixed collar, $v$, on the end of said shaft and to each of said arms. The arms are attached to the collars in such manner that they will be supported radially and maintained equal distances apart at their ends in whatever position they may be set. These arms are adapted for adjustment not only in check-rows of different distances apart, but to correct the over and the under stepping of the mark, which is liable to occur in the revolving action of the arms. This is effected by increasing or diminishing the diameter of the circle described by said arms to change the distance between their ends. This adjustment is made by setting the movable collar nearer to or farther from the fixed collar; and for this purpose the sliding collar is provided with an arm, $w$, the connection being such as to allow said collar to revolve with the shaft while the arm is held in position by the standard. When the sliding collar is set in so as to give the circle described by the arms the minimum diameter the arms will stand in oblique relation to the axis of their carrying-shaft, as shown in Fig. 6, and be adapted for planting in check-rows three feet apart. The setting of the collar out so as to give the circle described by the arms the maximum diameter will place the arms in position at right angles, or nearly so, to the line of the shaft, as shown by dotted lines in Fig. 6, and the distance between the ends of the arms will be four feet, and adapted for planting in check-rows that distance apart, and in this way the marker is suited for planting in hills three or four feet apart, more or less.

Now, in revolving markers with fixed arms they are liable to fall behind the mark as the machine moves forward, and the planting in such case would be out of check-rows, and the capacity of the arms for being spread or contracted enables the operator to correct this irregular planting. As soon as the person who drops the seed discovers this he sets the collar out to spread the arms and increase their distance apart, so that the next arm will step in the mark; but as the next arm would again overstep the mark he at once moves the collar back to bring the ends of the arms the same distance apart as the check-rows. The same result is effected if from any cause the arms overstep the mark, either in planting check-rows three or four feet apart, and this is done while the machine is planting.

The standard which supports the hill-checker end of the shaft has an open-top bearing, $y$, within which this end of the shaft is free to rise and fall as the arms travel over uneven ground, and for the purpose of placing the marker out of action to turn the machine at the end of the row, or in going to and from the field, the shaft is raised out of its slotted bearing and supported in a semicircular recess, $z$, in the top of the standard so as to clear the marking-arms of the ground.

The rod that carries the valve is placed high up across the spout, so that it will pass over obstructions on the ground.

The inclined arm $s'$ must not be quite as long as the radial sides of the teeth of the wheel $q$, so that when the bent end $r'$ of the rod $r$ passes off the tooth it will drop upon, depress, and pass off the inclined arm $s'$, and thus turn the rod and open the valve, when the spring instantly closes it. The valve-rod $s^2$ and the wheel-rod $r$ are made to spring a little, so that the rod $r$ can pass freely up back of the inclined arm $s'$ and take its position over it and a little in front of the valve-rod, so that when the vertical rod falls it will open the valve, as before.

In Figs. 5 and 8 the bent end $s$ of the rod $r$ is shown in position above the inclined arm $s'$ of the valve-rod, and the dotted lines in Fig. 8 show the rod $r$ as having been dropped by the toothed wheel $q$ to open the valve. I do not, however, confine myself to this arrangement for opening the valve.

In Fig. 1 the valve operating toothed wheel $q$ is shown as having one more tooth than there are marking-arms; but they should be of equal number, as shown in the detail view in Fig. 9.

I claim—

1. In combination with the permanent frame, the means employed for operating the seed-dropping valve $d'$, adapted to be closed by a spring, consisting of the revolving marking-arms $p$, the saw-toothed wheel $q q'$ on the shaft of said marking-arms, the vertical rod $r$, operated by said wheel, and the arm $s'$ for opening said valve, the teeth of said wheel corresponding in number and position to the marking-arms, for operation substantially as and for the purpose herein set forth.

2. The combination, in a potato-planter, of the hinged arms $e$ $e$, the furrow-forming tooth $d$, adjustably pivoted between said arms, and the valved seed-dropping tube $c$, rigidly secured to said hinged arms, with the vertically-adjustable brace $g$, pivoted to the rear ends of said arms, the lever $b^7$, pivoted to and crossing the rear of the frame, and connected with said brace, and the fixed hopper $b^6$, the said hinged arms having the scrapers $j$, substantially as described, for the purpose specified.

3. The combination of the frame, and the planting devices carried thereby, with revolving marking-arms adapted for adjustment to increase or diminish the distance between their marking ends, and a lifting and dropping toothed device for operating the dropping-valve, whereby to plant in check-rows of different distances apart.

4. The combination of the pivoted dropping-valve $d'$, with the inclined arm $s'$, carried by the valve-rod $s^2$, the lifting and falling rod $r$ for operating said inclined arm, and the saw-toothed wheel for operating said lifting and falling rod by the rotation of the check-row device, substantially as herein set forth.

5. The combination of the frame, and the planting devices carried thereby, with a revolving marking device consisting of the arms $p$, pivoted to an adjustable collar, $t$, and the braces $u$, pivoted to said arms and to a fixed collar, $v$, both said collars being carried by the shaft of the marking device, whereby the said adjustable collar is set toward or from the fixed collar to vary the distance between the marking ends to correspond with the check-row marks.

6. The combination of the frame-standards, one of which is provided with an open-top bearing, $y$, and a recess, $z$, above and at one side of said bearing, with the revolving hill-checker, adapted to be supported upon said recessed standard to free its arms from the ground, substantially as and for the purpose herein set forth.

7. The combination of the adjustable collar $t$, of the check-row marking-arms, and the open-top standard of the frame, with the arm $w$, connected with said collar, as a means whereby the person who drops the seed is enabled to keep the marker in check-rows, as described.

In testimony whereof I have hereunto set my hand in the presence of two subscribing witnesses.

HORACE M. KEITH.

Witnesses:
 LUDOVIC R. COLE,
 K. D. HARGER.